(12) United States Patent
Ryu et al.

(10) Patent No.: US 10,634,067 B2
(45) Date of Patent: Apr. 28, 2020

(54) SYSTEM AND METHOD FOR CONTROLLING VALVE TIMING OF CONTINUOUS VARIABLE VALVE DURATION ENGINE

(71) Applicants: HYUNDAI MOTOR COMPANY, Seoul (KR); KIA MOTORS CORPORATION, Seoul (KR)

(72) Inventors: In Sang Ryu, Incheon (KR); Kyoung Pyo Ha, Seongnam-si (KR); You Sang Son, Suwon-si (KR); Kiyoung Kwon, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 110 days.

(21) Appl. No.: 15/839,624

(22) Filed: Dec. 12, 2017

(65) Prior Publication Data

US 2018/0100447 A1 Apr. 12, 2018

Related U.S. Application Data

(63) Continuation-in-part of application No. 15/340,692, filed on Nov. 1, 2016, now Pat. No. 9,932,908.

(30) Foreign Application Priority Data

Dec. 11, 2015 (KR) ......................... 10-2015-0176783
Nov. 20, 2017 (KR) ......................... 10-2017-0154705

(51) Int. Cl.
*F02D 13/02* (2006.01)
*F01L 13/00* (2006.01)
(Continued)

(52) U.S. Cl.
CPC ...... *F02D 13/0207* (2013.01); *F01L 13/0015* (2013.01); *F02D 13/0203* (2013.01);
(Continued)

(58) Field of Classification Search
CPC ....... F01L 2001/34493; F01L 2013/101; F01L 2013/103; F01L 2800/13; F02D 13/0203;
(Continued)

(56) References Cited

U.S. PATENT DOCUMENTS

| 3,633,555 A | 1/1972 | Raggi |
| 4,552,112 A | 11/1985 | Nagao et al. |

(Continued)

FOREIGN PATENT DOCUMENTS

| JP | H07-42514 A | 2/1995 |
| JP | H 07-324610 A | 12/1995 |

(Continued)

OTHER PUBLICATIONS

Non-Final Office Action dated Dec. 11, 2018 from the corresponding U.S. Appl. No. 15/258,043, 18 pages.
(Continued)

*Primary Examiner* — Erick R Solis
(74) *Attorney, Agent, or Firm* — Brinks Gilson & Lione

(57) ABSTRACT

A method for controlling intake and exhaust valves of an engine may include: determining, by a controller, a target opening duration of the intake and exhaust valves based on an engine load and an engine speed; modifying, by an intake continuous variable valve duration (CVVD) device and by an exhaust CVVD device, current opening and closing timings of the intake valve and/or exhaust valve based on the target opening duration of the valves; and advancing or retarding, by the intake and/or exhaust CVVD devices, the current opening timing of the intake and exhaust valves while simultaneously retarding or advancing the current
(Continued)

closing timing of the intake and exhaust valve by a predetermined value based on the target opening duration.

14 Claims, 12 Drawing Sheets

(51) Int. Cl.
  *F02D 41/00* (2006.01)
  *F02D 9/02* (2006.01)
  *F01L 1/053* (2006.01)
  *F01L 1/356* (2006.01)
  *F01L 1/047* (2006.01)
  *F01L 1/344* (2006.01)

(52) U.S. Cl.
  CPC ..... *F02D 13/0215* (2013.01); *F02D 13/0234* (2013.01); *F02D 13/0249* (2013.01); *F02D 13/0253* (2013.01); *F02D 13/0261* (2013.01); *F02D 41/0007* (2013.01); F01L 1/356 (2013.01); F01L 2001/0473 (2013.01); F01L 2001/0537 (2013.01); F01L 2001/34493 (2013.01); F01L 2013/101 (2013.01); F01L 2013/103 (2013.01); F01L 2800/00 (2013.01); F01L 2800/01 (2013.01); F01L 2800/04 (2013.01); F01L 2800/13 (2013.01); F01L 2820/04 (2013.01); F01L 2820/041 (2013.01); F01L 2820/042 (2013.01); F01L 2820/044 (2013.01); F02D 2009/0235 (2013.01); F02D 2041/001 (2013.01); F02D 2041/002 (2013.01); F02D 2200/101 (2013.01); F02D 2200/1002 (2013.01); Y02T 10/144 (2013.01); Y02T 10/18 (2013.01)

(58) Field of Classification Search
  CPC ............. F02D 13/0215; F02D 13/0234; F02D 13/0249; F02D 13/0253
  See application file for complete search history.

(56) References Cited

U.S. PATENT DOCUMENTS

| | | | |
|---|---|---|---|
| 5,050,543 A | 9/1991 | Kawamura | |
| 5,080,055 A | 1/1992 | Komatsu et al. | |
| 5,121,733 A | 6/1992 | Goto et al. | |
| 5,161,497 A | 11/1992 | Simko et al. | |
| 5,224,460 A | 7/1993 | Havstad et al. | |
| 5,398,502 A | 3/1995 | Watanabe | |
| 5,419,301 A * | 5/1995 | Schechter | F01L 9/02 123/673 |
| 5,421,308 A | 6/1995 | Hitomi et al. | |
| 5,429,100 A | 7/1995 | Goto et al. | |
| 5,450,824 A | 9/1995 | Yamane et al. | |
| 5,469,818 A | 11/1995 | Yoshioka et al. | |
| 5,497,737 A | 3/1996 | Nakamura | |
| 5,531,193 A | 7/1996 | Nakamura | |
| 5,553,573 A | 9/1996 | Hara et al. | |
| 5,622,144 A | 4/1997 | Nakamura et al. | |
| 5,687,681 A | 11/1997 | Hara | |
| 5,698,779 A | 12/1997 | Yoshioka | |
| 5,778,840 A | 7/1998 | Murata et al. | |
| 5,809,955 A | 9/1998 | Murata et al. | |
| 5,924,334 A | 7/1999 | Hara et al. | |
| 5,931,128 A | 8/1999 | Murata et al. | |
| 5,992,361 A | 11/1999 | Murata et al. | |
| 6,006,707 A * | 12/1999 | Ito | F01L 1/34406 123/90.15 |
| 6,029,618 A | 2/2000 | Hara et al. | |
| 6,055,948 A | 5/2000 | Shiraishi et al. | |
| 6,318,343 B1 | 11/2001 | Nakagawa et al. | |
| 6,336,436 B1 | 1/2002 | Miyakubo et al. | |
| 6,553,949 B1 | 4/2003 | Kolmanovsky et al. | |
| 6,564,763 B2 | 5/2003 | Shiraishi et al. | |
| 6,575,128 B2 | 6/2003 | Nakamura et al. | |
| 6,598,569 B2 | 7/2003 | Takemura et al. | |
| 6,619,242 B2 | 9/2003 | Kaneko | |
| 6,761,147 B2 | 7/2004 | Majima | |
| 6,782,853 B2 | 8/2004 | Kanamaru et al. | |
| 6,810,844 B2 | 11/2004 | Sellnau | |
| 6,837,199 B2 | 1/2005 | Matsuura et al. | |
| 6,920,851 B2 | 7/2005 | Machida et al. | |
| 7,073,493 B2 | 7/2006 | Nakasaka et al. | |
| 7,152,578 B2 | 12/2006 | Yui | |
| 7,159,547 B2 | 1/2007 | Nakasaka et al. | |
| 7,168,396 B1 | 1/2007 | Bulicz et al. | |
| 7,290,527 B2 | 11/2007 | Kobayashi et al. | |
| 7,398,772 B2 | 7/2008 | Nakasaka et al. | |
| 7,513,231 B2 | 4/2009 | Ezaki et al. | |
| 7,520,261 B2 | 4/2009 | Saruwatari et al. | |
| 7,739,987 B2 | 6/2010 | Hoshikawa et al. | |
| 7,793,625 B2 | 9/2010 | Nakamura et al. | |
| 7,823,550 B2 | 11/2010 | Murata | |
| 8,205,587 B2 | 6/2012 | Murata et al. | |
| 8,235,015 B2 | 8/2012 | Murata | |
| 8,355,235 B2 | 1/2013 | Machida et al. | |
| 8,468,986 B2 | 6/2013 | Ito et al. | |
| 8,677,957 B2 | 3/2014 | Goto et al. | |
| 8,857,392 B2 | 10/2014 | Von Gaisberg-Heifenberg et al. | |
| 8,887,691 B2 | 11/2014 | Chen et al. | |
| 8,955,478 B2 | 2/2015 | Yano et al. | |
| 8,985,074 B2 | 3/2015 | Zurface et al. | |
| 9,046,012 B2 | 6/2015 | Yano et al. | |
| 9,194,261 B2 | 11/2015 | McCarthy, Jr. | |
| 9,284,859 B2 | 3/2016 | Nielsen et al. | |
| 9,291,075 B2 | 3/2016 | Zurface et al. | |
| 9,347,384 B2 | 5/2016 | Takada et al. | |
| 9,512,748 B2 | 12/2016 | Kim et al. | |
| 9,527,501 B2 | 12/2016 | Asami et al. | |
| 9,528,402 B2 | 12/2016 | Cleeves et al. | |
| 9,574,467 B2 | 2/2017 | Ha | |
| 9,650,924 B2 | 5/2017 | Bandyopadhyay et al. | |
| 9,664,075 B2 | 5/2017 | McCarthy, Jr. | |
| 9,702,279 B2 | 7/2017 | Zurface et al. | |
| 9,726,052 B2 | 8/2017 | Zurface et al. | |
| 9,739,211 B2 | 8/2017 | Suzuki | |
| 9,797,321 B2 | 10/2017 | Sun et al. | |
| 9,822,673 B2 | 11/2017 | Spoor et al. | |
| 9,850,789 B2 | 12/2017 | Son et al. | |
| 9,863,331 B2 | 1/2018 | Ryu et al. | |
| 9,863,340 B2 | 1/2018 | Ryu et al. | |
| 9,874,122 B2 | 1/2018 | Schultheis et al. | |
| 9,874,153 B2 | 1/2018 | Ryu et al. | |
| 9,874,154 B2 | 1/2018 | Ryu et al. | |
| 9,879,619 B2 | 1/2018 | Ryu et al. | |
| 9,885,258 B2 | 2/2018 | Spoor et al. | |
| 9,889,838 B2 | 2/2018 | Ryu et al. | |
| 9,903,281 B2 | 2/2018 | Ryu et al. | |
| 9,915,180 B2 | 3/2018 | Spoor et al. | |
| 9,932,883 B2 | 4/2018 | Iwai et al. | |
| 9,932,908 B2 | 4/2018 | Ryu et al. | |
| 9,938,865 B2 | 4/2018 | Radulescu et al. | |
| 9,964,005 B2 | 5/2018 | Zurface et al. | |
| 9,964,050 B2 | 5/2018 | Ryu et al. | |
| 10,006,378 B2 | 6/2018 | Ryu et al. | |
| 10,024,244 B2 | 7/2018 | Ryu et al. | |
| 10,047,683 B2 | 8/2018 | Ryu et al. | |
| 10,047,684 B2 | 8/2018 | Ryu et al. | |
| 10,087,790 B2 | 10/2018 | Genise et al. | |
| 10,119,429 B2 | 11/2018 | Nielsen et al. | |
| 10,132,249 B2 | 11/2018 | Ryu et al. | |
| 10,138,767 B2 | 11/2018 | Kim | |
| 10,145,312 B2 | 12/2018 | Ryu et al. | |
| 10,174,645 B2 | 1/2019 | Kim et al. | |
| 10,180,087 B2 | 1/2019 | Zurface et al. | |
| 10,202,909 B2 | 2/2019 | Okazaki et al. | |
| 10,202,918 B2 | 2/2019 | Ryu et al. | |
| 10,316,763 B2 | 6/2019 | Ryu et al. | |
| 10,323,585 B2 | 6/2019 | Ryu et al. | |
| 10,329,970 B2 | 6/2019 | McCarthy, Jr. | |
| 10,393,032 B2 | 8/2019 | He et al. | |
| 10,393,037 B2 | 8/2019 | Ryu et al. | |

(56) References Cited

U.S. PATENT DOCUMENTS

| | | |
|---|---|---|
| 10,415,439 B2 | 9/2019 | Radulescu et al. |
| 10,415,485 B2 | 9/2019 | Ryu et al. |
| 10,415,488 B2 | 9/2019 | Ryu et al. |
| 10,428,747 B2 | 10/2019 | Ryu et al. |
| 10,443,514 B2 | 10/2019 | Ryu et al. |
| 2001/0025615 A1 | 10/2001 | Nohara et al. |
| 2001/0032605 A1 | 10/2001 | Kadowaki |
| 2001/0045194 A1 | 11/2001 | Shiraishi et al. |
| 2001/0050067 A1 | 12/2001 | Sato |
| 2002/0017256 A1 | 2/2002 | Shiraishi et al. |
| 2002/0043243 A1 | 4/2002 | Majima |
| 2002/0108592 A1 | 8/2002 | Takemura et al. |
| 2002/0148422 A1 | 10/2002 | Shiraishi et al. |
| 2002/0166524 A1 | 11/2002 | Nakamura et al. |
| 2003/0131805 A1 | 7/2003 | Yang |
| 2004/0099244 A1 | 5/2004 | Matsuura et al. |
| 2005/0205069 A1* | 9/2005 | Lewis .................. F01L 1/38 123/491 |
| 2005/0235933 A1 | 10/2005 | Arai et al. |
| 2006/0037571 A1 | 2/2006 | Machida |
| 2006/0090730 A1 | 5/2006 | Yui |
| 2006/0266311 A1 | 11/2006 | Fujii |
| 2007/0181096 A1 | 8/2007 | Wagner et al. |
| 2007/0272202 A1 | 11/2007 | Kuo et al. |
| 2008/0029050 A1 | 2/2008 | Ichmura et al. |
| 2008/0115750 A1 | 5/2008 | Hahn et al. |
| 2008/0210195 A1 | 9/2008 | Saruwatari et al. |
| 2008/0300773 A1* | 12/2008 | Winstead .......... F02D 13/0253 701/105 |
| 2008/0308053 A1 | 12/2008 | Tsuchida |
| 2009/0000582 A1 | 1/2009 | Tanabe et al. |
| 2009/0007564 A1 | 1/2009 | Suzuki et al. |
| 2009/0007867 A1* | 1/2009 | Tanabe ................ F01L 13/0063 123/90.17 |
| 2009/0031973 A1 | 2/2009 | Murata |
| 2009/0241877 A1 | 10/2009 | Hoshikawa |
| 2009/0272363 A1 | 11/2009 | Yun et al. |
| 2009/0277434 A1 | 11/2009 | Surnilla |
| 2010/0023242 A1 | 1/2010 | Kawamura |
| 2010/0217504 A1 | 8/2010 | Fujii et al. |
| 2012/0000197 A1 | 1/2012 | Maruyama et al. |
| 2012/0004826 A1 | 1/2012 | Shimo et al. |
| 2013/0146006 A1* | 6/2013 | Kim ..................... F01L 1/0532 123/90.17 |
| 2013/0146037 A1* | 6/2013 | Han .................... F02D 41/10 123/565 |
| 2013/0206104 A1 | 8/2013 | Kuhlmeyer et al. |
| 2013/0213332 A1 | 8/2013 | Yano et al. |
| 2013/0276731 A1 | 10/2013 | Yano et al. |
| 2014/0165963 A1* | 6/2014 | Langham ............ F02D 41/021 123/350 |
| 2015/0034052 A1 | 2/2015 | Shimizu |
| 2015/0040876 A1 | 2/2015 | Cleeves et al. |
| 2015/0101319 A1 | 4/2015 | Takada et al. |
| 2015/0114342 A1 | 4/2015 | Iwai et al. |
| 2015/0167508 A1 | 6/2015 | Ha |
| 2015/0167509 A1 | 6/2015 | Ha |
| 2015/0247467 A1 | 9/2015 | Suzuki |
| 2016/0090877 A1 | 3/2016 | Kim et al. |
| 2016/0160706 A1 | 6/2016 | Son et al. |
| 2016/0169066 A1 | 6/2016 | Son et al. |
| 2017/0082036 A1* | 3/2017 | Kwon ................ F01L 13/0015 |
| 2017/0082037 A1 | 3/2017 | Ryu et al. |
| 2017/0089230 A1 | 3/2017 | Son et al. |
| 2017/0114680 A1* | 4/2017 | Kim .................... F01L 1/047 |
| 2017/0167318 A1 | 6/2017 | Ryu et al. |
| 2017/0167323 A1 | 6/2017 | Son et al. |
| 2017/0167393 A1 | 6/2017 | Ryu et al. |
| 2017/0167394 A1 | 6/2017 | Ryu et al. |
| 2017/0167396 A1 | 6/2017 | Ryu et al. |
| 2017/0167398 A1 | 6/2017 | Ryu et al. |
| 2017/0167399 A1 | 6/2017 | Ryu et al. |
| 2017/0167400 A1 | 6/2017 | Ryu et al. |
| 2017/0167401 A1 | 6/2017 | Ryu et al. |
| 2017/0167402 A1 | 6/2017 | Ryu et al. |
| 2017/0167403 A1 | 6/2017 | Ryu et al. |
| 2017/0167404 A1 | 6/2017 | Ryu et al. |
| 2017/0167405 A1 | 6/2017 | Ryu et al. |
| 2017/0167406 A1 | 6/2017 | Ryu et al. |
| 2017/0167407 A1 | 6/2017 | Ryu et al. |
| 2017/0167408 A1 | 6/2017 | Ryu et al. |
| 2017/0167409 A1 | 6/2017 | Ryu et al. |
| 2017/0167414 A1 | 6/2017 | Ryu et al. |
| 2017/0226940 A1 | 8/2017 | Sun et al. |
| 2017/0234243 A1 | 8/2017 | Ryu et al. |
| 2017/0268435 A1 | 9/2017 | Ryu et al. |
| 2017/0268436 A1 | 9/2017 | Ryu et al. |
| 2017/0268437 A1 | 9/2017 | Ryu et al. |
| 2017/0284235 A1 | 10/2017 | Son et al. |
| 2017/0284238 A1 | 10/2017 | Son et al. |
| 2018/0058343 A1 | 3/2018 | He et al. |
| 2018/0073455 A1 | 3/2018 | Barra |
| 2018/0100444 A1 | 4/2018 | Ryu et al. |
| 2018/0100445 A1 | 4/2018 | Ryu et al. |
| 2018/0100446 A1 | 4/2018 | Ryu et al. |
| 2018/0100447 A1 | 4/2018 | Ryu et al. |
| 2018/0100448 A1 | 4/2018 | Ryu et al. |
| 2018/0100452 A1 | 4/2018 | Ryu et al. |
| 2018/0100453 A1 | 4/2018 | Ryu et al. |
| 2018/0100454 A1 | 4/2018 | Ryu et al. |

FOREIGN PATENT DOCUMENTS

| | | |
|---|---|---|
| JP | 2005-098150 | 4/2005 |
| JP | 2006-046293 A | 2/2006 |
| JP | 2006-118381 A | 5/2006 |
| JP | 2008-151059 A | 7/2008 |
| JP | 2008-274963 A | 11/2008 |
| JP | 2010-216464 A | 9/2010 |
| KR | 10-0321206 B1 | 1/2002 |
| KR | 10-2009-0013007 A | 2/2009 |
| WO | 2013-171830 A1 | 11/2013 |

OTHER PUBLICATIONS

Non-Final Office Action dated May 16, 2018 from the corresponding U.S. Appl. No. 15/258,043, 9 pages.

Notice of Allowance dated May 16, 2018 from the corresponding U.S. Appl. No. 15/340,742, 52 pages.

Final Office Action dated Sep. 6, 2018 from the corresponding U.S. Appl. No. 15/258,154, 15 pages.

Non-Final Office Action dated Sep. 7, 2018 from the corresponding U.S. Appl. No. 15/839,581, 15 pages.

Non-Final Office Action dated Aug. 24, 2018 from the corresponding U.S. Appl. No. 15/840,079, 41 pages.

Extended European Search Report dated Mar. 4, 2019 from the corresponding European Application No. 18201117.1 (9 pages).

Final Office Action dated Apr. 11, 2019 from corresponding U.S. Appl. No. 15/839,606 (13 pages).

Notice of Allowance dated Mar. 18, 2019 from corresponding U.S. Appl. No. 15/839,581, 14 pages.

Final Office Action dated Mar. 18, 2019 from corresponding U.S. Appl. No. 15/840,079, 31 pages.

Non-Final Office Action dated Sep. 28, 2018 from the corresponding U.S. Appl. No. 15/839,606, 33 pages.

Non-Final Office Action dated Oct. 5, 2018 from the corresponding U.S. Appl. No. 15/839,626, 19 pages.

Non-Final Office Action dated Oct. 10, 2018 from the corresponding U.S. Appl. No. 15/839,596, 29 pages.

Notice of Allowance dated Oct. 24, 2019 from the corresponding U.S. Appl. No. 16/169,578, 13 pages.

Non-Final Office Action dated Oct. 31, 2019 from the corresponding U.S. Appl. No. 15/839,028, 26 pages.

Notice of Allowance dated Feb. 28, 2020 from the corresponding U.S. Appl. No. 15/839,028, 18 pages.

* cited by examiner

FIG. 5A
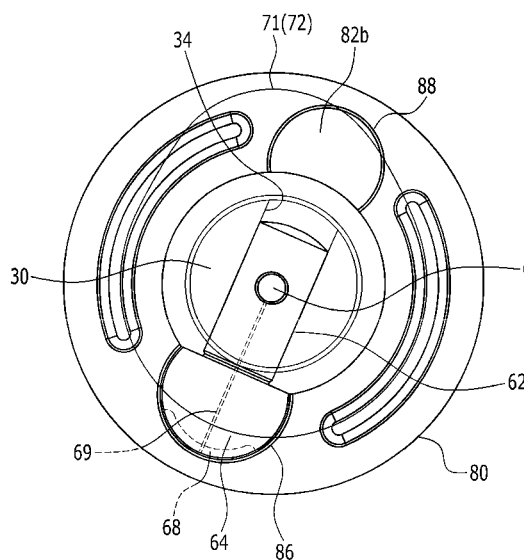
FIG. 5B
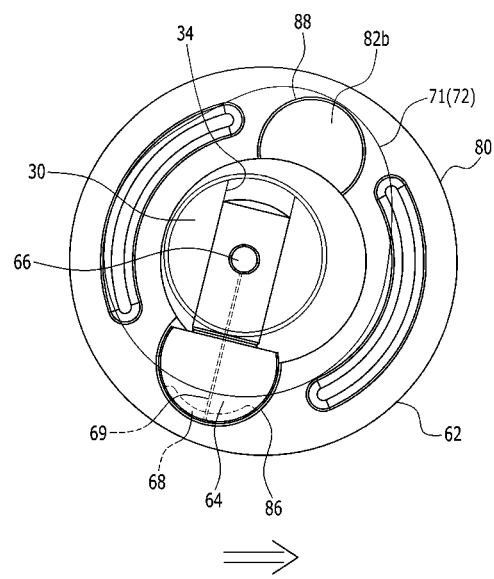
FIG. 5C
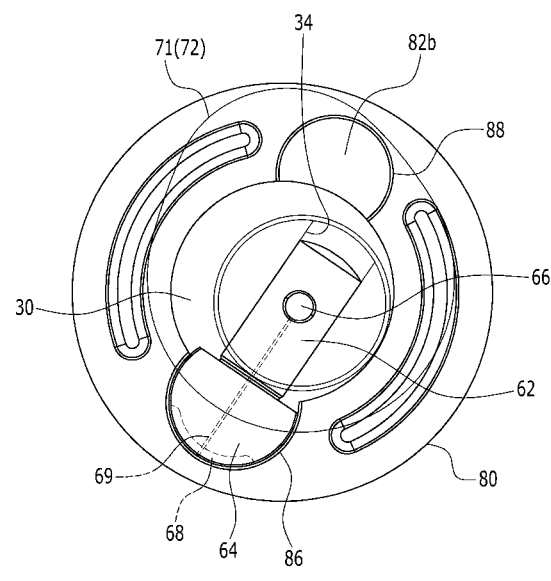

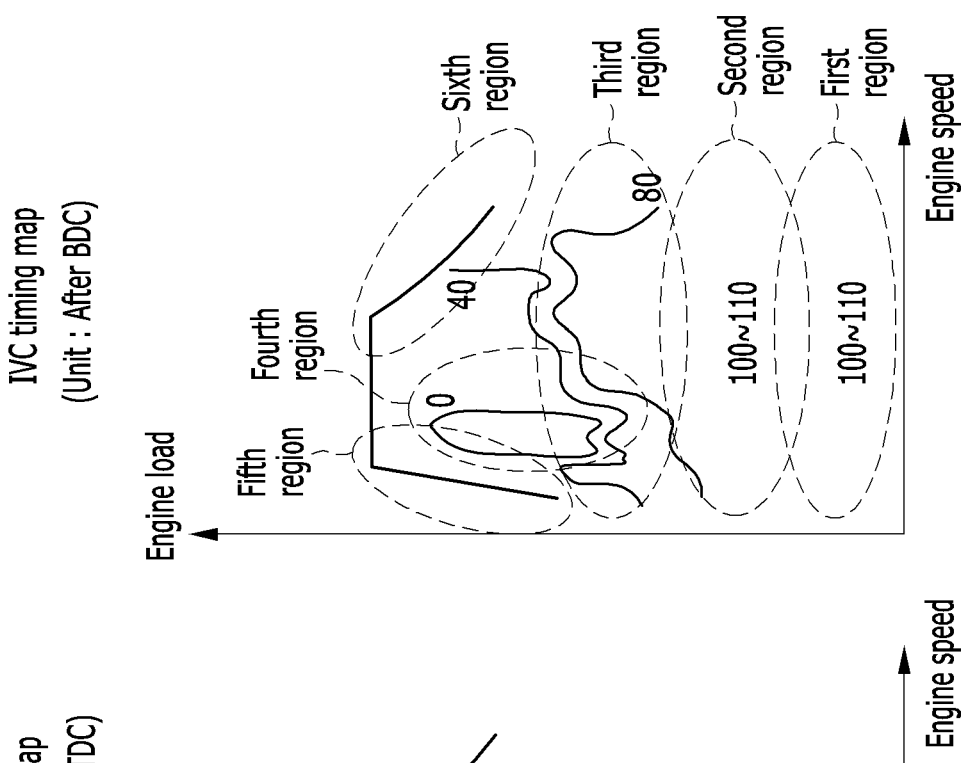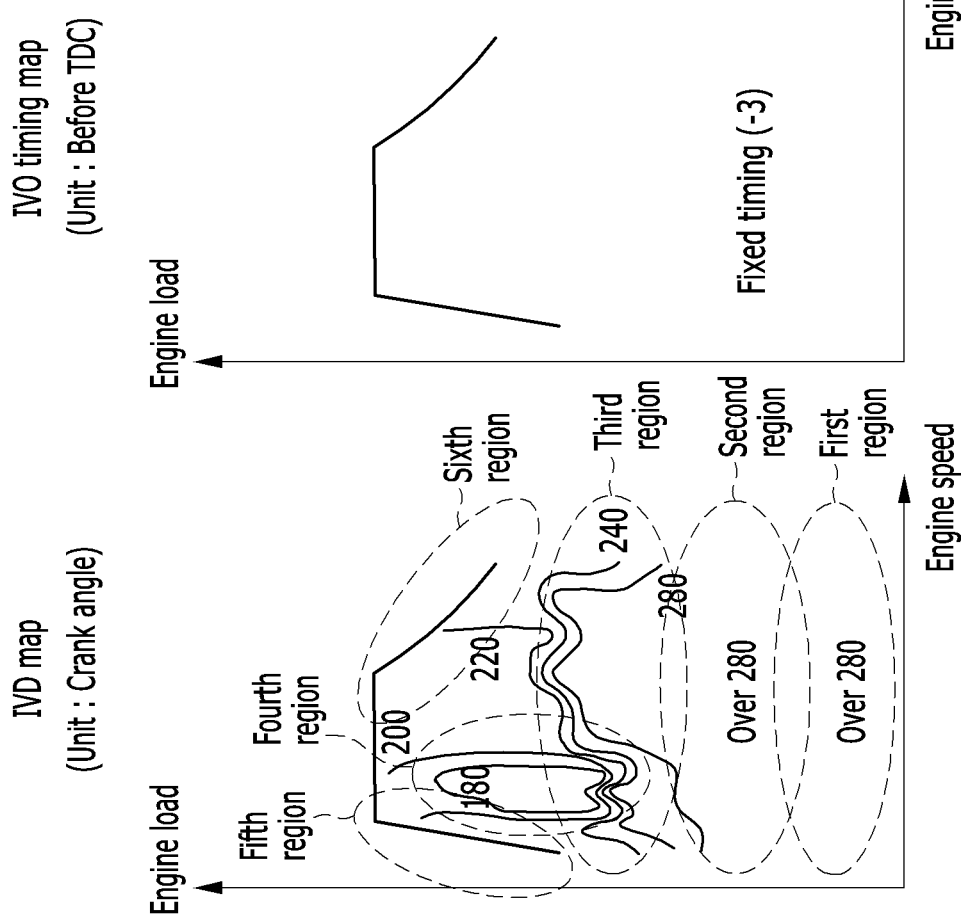

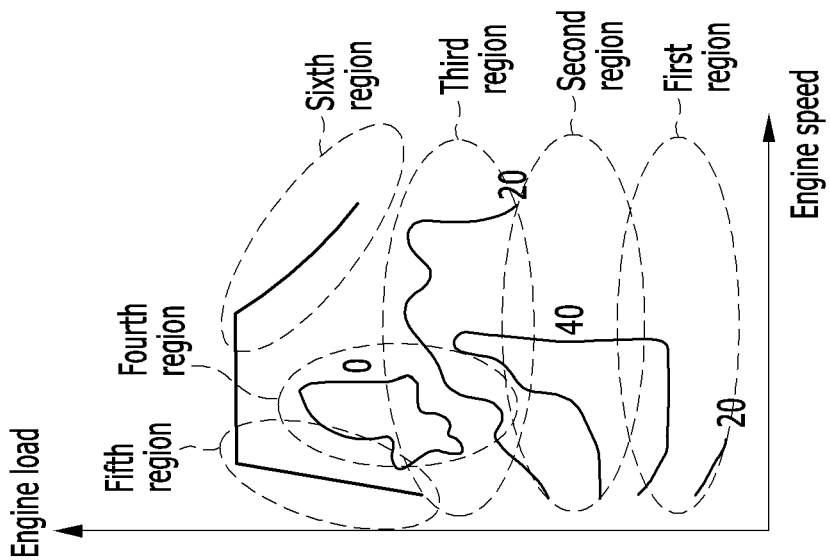
FIG. 12B
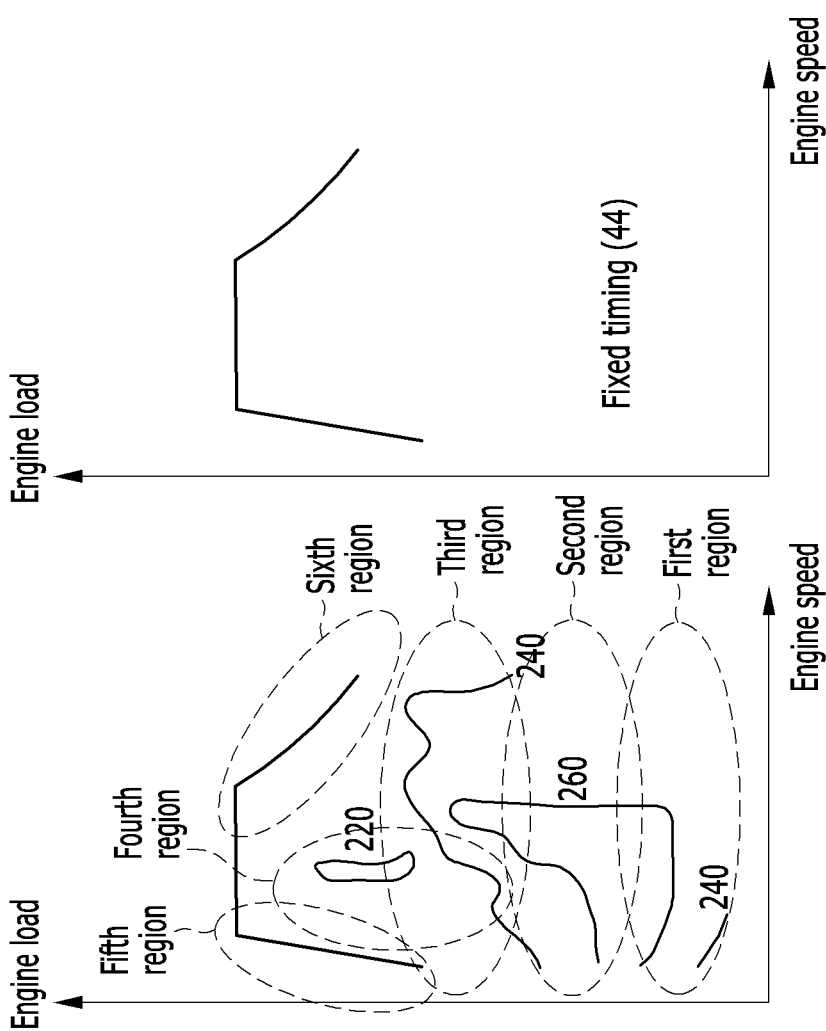

SYSTEM AND METHOD FOR CONTROLLING VALVE TIMING OF CONTINUOUS VARIABLE VALVE DURATION ENGINE

CROSS-REFERENCE TO RELATED APPLICATIONS

This application is a continuation-in-part of U.S. patent application Ser. No. 15/340,692, filed on Nov. 1, 2016, and claims priority to and the benefit of Korean Patent Application Nos. 10-2015-0176783, filed on Dec. 11, 2015, and 10-2017-0154705, filed on Nov. 20, 2017, the entirety each of which are incorporated herein by reference.

FIELD

The present disclosure relates to a system and a method for controlling valve timing of a continuous variable valve duration engine.

BACKGROUND

The statements in this section merely provide background information related to the present disclosure and may not constitute prior art.

An internal combustion engine combusts mixed gas in which fuel and air are mixed at a predetermined ratio through a set ignition mode to generate power by using explosion pressure.

Generally, a camshaft is driven by a timing belt connected with a crankshaft that converts linear motion of a piston by the explosion pressure into rotating motion to actuate an intake valve and an exhaust valve, and while the intake valve is opened, air is suctioned into a combustion chamber, and while an exhaust valve is opened, gas which is combusted in the combustion chamber is exhausted.

In the operations of the intake valve and the exhaust valve, when a valve lift and a valve opening/closing time (timing) are controlled according to a rotational speed or load of an engine desired engine performance may be secured. Therefore, a continuous variable valve duration (CVVD) device controlling opening duration of an intake valve and an exhaust valve of the engine and a continuous variable valve timing (CVVT) device controlling opening timing and closing timing of the intake valve and the exhaust valve of the engine have been developed.

The CVVD device adjusts duration of the valve. In addition, the CVVT device advances or retards opening and closing timing of the valve in a state in which the duration of the valve is fixed. In other words, when the opening timing of the valve is determined, the closing timing is automatically determined according to the duration of the valve.

The above information disclosed in this Background section is only for enhancement of understanding of the background of the present disclosure and therefore it may contain information that does not form the prior art that is already known to a person of ordinary skill in the art.

Further areas of applicability will become apparent from the description provided herein. It should be understood that the description and specific examples are intended for purposes of illustration only and are not intended to limit the scope of the present disclosure.

SUMMARY

The present disclosure provides a system and a method for controlling valve timing of a continuous variable valve duration engine having advantages of controlling duration and timing according to an engine speed and an engine load by mounting continuous variable valve duration devices on an intake and an exhaust in a turbo engine.

In one form of the present disclosure, a method for controlling intake and exhaust valves of an engine includes: determining, by a controller, a target opening duration of the intake valve, a target opening duration of the exhaust valve based on an engine load and an engine speed; modifying, by an intake continuous variable valve duration (CVVD) device, current opening and closing timings of the intake valve based on the target opening duration of the intake valve; modifying, by an exhaust CVVD device, current opening and closing timings of the exhaust valve based on the target opening duration of the exhaust valve; advancing, by the intake CVVD device, the current opening timing of the intake valve while simultaneously retarding the current closing timing of the intake valve by a predetermined value, or retarding the current opening timing of the intake valve while simultaneously advancing the current closing timing of the intake valve by a predetermined value, based on the target opening duration of the intake valve; and advancing, by the exhaust CVVD device, the current opening timing of the exhaust valve while simultaneously retarding the current closing timing of the exhaust valve by a predetermined value, or retarding the current opening timing of the exhaust valve while simultaneously advancing the current closing timing of the exhaust valve by a predetermined value, based on the target opening duration of the exhaust valve.

In one form, the intake CVVD device advances the current opening timing of the intake valve while simultaneously retarding the current closing timing of the intake valve when the target opening duration of the intake valve is longer than a duration between the current opening timing and current closing timing of the intake valve.

In another form, the intake CVVD device retards the current opening timing of the intake valve while simultaneously advancing the current closing timing of the intake valve when the target opening duration of the intake valve is shorter than a duration between the current opening timing and current closing timing of the intake valve.

The exhaust CVVD device advances the current opening timing of the exhaust valve while simultaneously retarding the current closing timing of the exhaust valve when the target opening duration of the exhaust valve is longer than a duration between the current opening timing and current closing timing of the exhaust valve.

In another form, the exhaust CVVD device retards the current opening timing of the exhaust valve while simultaneously advancing the current closing timing of the exhaust valve when the target opening duration of the exhaust valve is shorter than a duration between the current opening timing and current closing timing of the exhaust valve.

During the step of determining the target opening duration of the intake valve, the controller sets the target opening duration of the intake valve to a first intake opening duration in a first control region where the engine load is between first and second predetermined loads, and the controller controls the intake CVVD device to adjust a current intake opening duration to the first intake opening duration.

In the first control region, the current closing timing of the intake valve is fixed and the current closing timing of the exhaust valve is set to be a maximum value capable of maintaining combustion stability in the first control region.

During the step of determining the target intake and exhaust opening durations, the controller sets the target opening duration of the intake and exhaust valves to be predetermined values in a second control region where the engine load is greater than a second predetermined load and equal to or less than a third predetermined load.

In particular, the predetermined value of the target opening duration of the intake valve and the predetermined value of the target opening duration of the exhaust valve are set to be a maximum value of opening duration of the intake and exhaust valves, respectively in the second control region.

The method further includes the step of retarding the current closing timing of the exhaust valve as the engine load increases in the second control region.

The method further includes the step of advancing the current closing timing of the intake valve by the intake CVVD device, and advancing the current closing timing of the exhaust valve by the exhaust CVVD device in a third control region where the engine load is greater than a third predetermined load and less than a fourth predetermined load and the engine speed is between first and second predetermined speeds, or where the engine load is greater than the third predetermined load and equal to or less than a fifth predetermined load and the engine speed is between the second predetermined speed and a third predetermined speed.

In one form, the current closing timing of the intake valve is advanced to be approximately at a bottom dead center (BDC) when the engine speed is less than a predetermined speed, and the current closing timing of the intake valve is advanced to be an angle after the BDC when the engine speed is equal to or greater than the predetermined speed in the third control region.

The method further has the step of controlling the current closing timing of the intake valve to be approximately at a bottom dead center (BDC) in a fourth control region where the engine load is greater than a fourth predetermined load and equal to or less than a fifth predetermined load and the engine speed is equal to or greater than a first predetermined speed and equal to or less than a second predetermined speed.

In the fourth control region, the current closing timing of the exhaust valve is controlled to be approximately at a top dead center.

The method further includes the step of controlling, by the controller, a throttle valve to be fully opened and controlling the current closing timing of the intake valve to be an angle after a bottom dead center in a fifth control region where the engine load is greater than a fifth predetermined load and equal to or less than a maximum engine load and the engine speed is between first and second predetermined speeds.

In addition, the method may include the step of controlling, by the controller, a throttle valve to be fully opened and advancing the current closing timing of the intake valve in a sixth control region where the engine load is greater than a fifth predetermined load and equal to or less than a maximum engine load and the engine speed is greater than a second predetermined speed and equal to or less than a third predetermined speed.

In particular, in the sixth control region, the current closing timing of the exhaust valve is controlled to be approximately at a top dead center so as to reduce a valve overlap.

According to one form of the present disclosure, duration and timing of the continuous variable valve are controlled, so the engine may be controlled under desirable conditions.

Opening timing and closing timing of the intake valve and the exhaust valve are appropriately controlled, thereby improving fuel efficiency under a partial load condition and power performance under a high load condition. In addition, a fuel amount for starting may be reduced by increasing a valid compression ratio, and exhaust gas may be reduced by shortening time for heating a catalyst.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 5A-5C are views illustrating the operation of a continuous variable valve duration device in FIG. 4;

FIGS. 11A-11C are graphs showing duration, opening timing, and closing timing of an intake valve depending on an engine load and an engine speed according to the present disclosure; and FIGS. 12A-12C are graphs showing duration, opening timing, and closing timing of an exhaust valve depending on an engine load and an engine speed according to the present disclosure.

Figure 1:
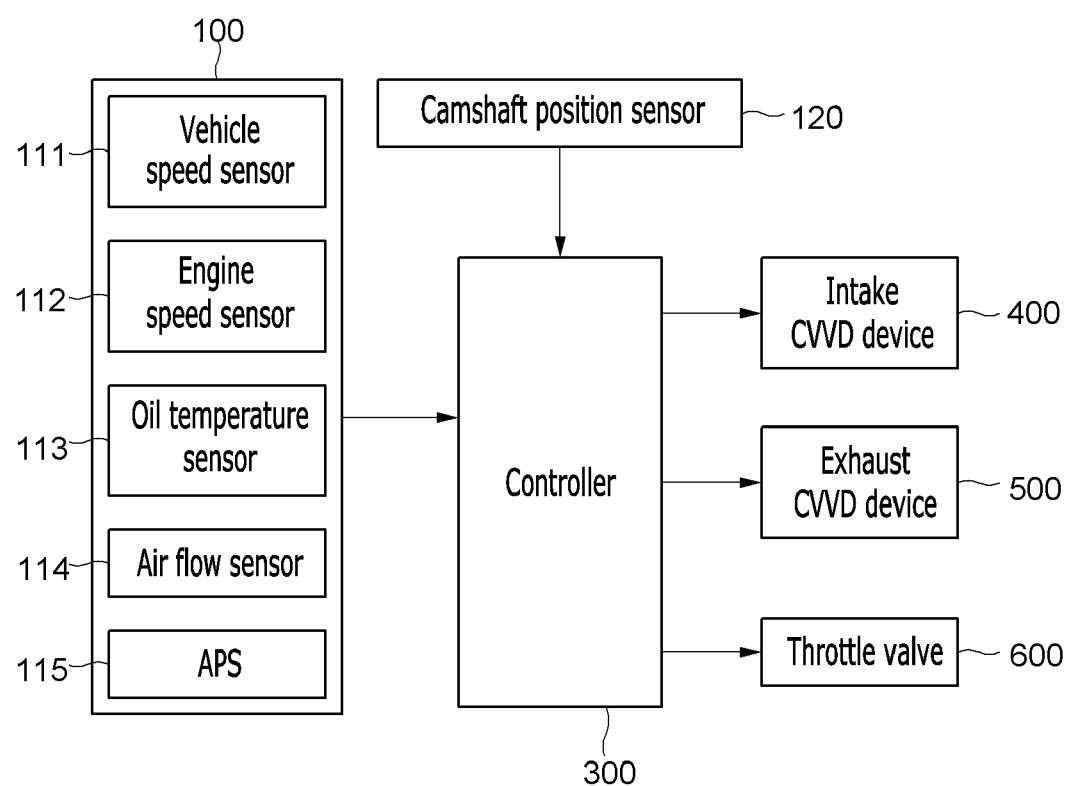
FIG. 1 is a schematic block diagram showing a system for controlling valve timing of a continuous variable valve duration engine according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

Throughout this specification, and the claims which follow, unless explicitly described to the contrary, the word "comprise" and variations such as "comprises" or "comprising" will be understood to imply the inclusion of stated elements but not the exclusion of any other elements.

It is understood that the term "vehicle" or "vehicular" or other similar terms as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example a gasoline-powered and electric-powered vehicle.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller are network (CAN).

FIG. 1 is a schematic block diagram showing a system for controlling valve timing of a continuous variable valve duration engine according to one form of the present disclosure.

According to one form of the present disclosure, the engine as a power source of a vehicle is a turbo engine that includes a turbocharger. As shown in FIG. 1, a system for controlling valve timing of a continuous variable valve duration engine includes a data detector 100, a camshaft position sensor 120, a controller 300, an intake continuous variable valve duration (CVVD) device 400, an exhaust continuous variable valve duration device 500, and a throttle valve 600, although other sensors or systems may be employed to detect or determine the desired data.

The data detector 100 detects data related to a running state of the vehicle for controlling the CVVD devices, and includes a vehicle speed sensor 111, an engine speed sensor 112, an oil temperature sensor 113, an air flow sensor 114, and an accelerator pedal position sensor (APS) 115.

The vehicle speed sensor 111 detects a vehicle speed, and transmits a signal corresponding thereto to the controller 300. The vehicle speed sensor 111 may be mounted at a wheel of the vehicle.

The engine speed sensor 112 detects an engine speed from a change in phase of a crankshaft or camshaft, and transmits a signal corresponding thereto to the controller 300.

The oil temperature sensor (OTS) 113 detects temperature of oil flowing through an oil control valve (OCV), and transmits a signal corresponding thereto to the controller 300.

The oil temperature detected by the oil temperature sensor 113 may be determined by determining a coolant temperature using a coolant temperature sensor mounted at a coolant passage of an intake manifold. Therefore, in in one form, the oil temperature sensor 113 may include the coolant temperature sensor, and the oil temperature should be understood to be the coolant temperature.

The air flow sensor 114 detects an air amount flowing into the intake manifold, and transmits a signal corresponding thereto to the controller 300.

The accelerator pedal position sensor 115 detects a degree at which a driver pushes an accelerator pedal, and transmits a signal corresponding thereto to the controller 300. A position value of the accelerator pedal is approximately 100% when the accelerator pedal is pressed fully, and the position value of the accelerator pedal is approximately 0% when the accelerator pedal is not pressed at all.

A throttle valve position sensor that is mounted on an intake passage may be used instead of the accelerator pedal position sensor 115. Therefore, in one form, the accelerator pedal position sensor 115 may include the throttle valve position sensor, and the position value of the accelerator pedal should be understood to be opening value of the throttle valve.

The camshaft position sensor 120 detects a position of a camshaft angle, and transmits a signal corresponding thereto to the controller 300.

Figure 2:
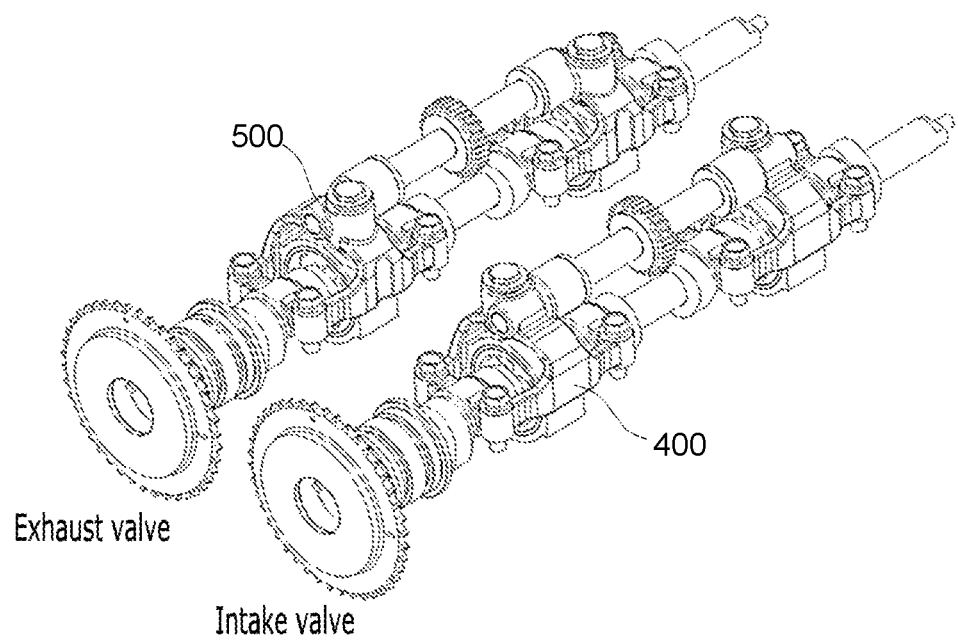
FIG. 2 is a perspective view showing an intake provided with a continuous variable valve duration device and an exhaust provided with a continuous variable valve duration device according to one form of the present disclosure.

FIG. 2 is a perspective view showing an intake provided with a continuous variable valve duration device and an exhaust provided with a continuous variable valve duration device according to one form of the present disclosure.

As shown in FIG. 2, continuous variable valve duration devices are mounted on the intake and the exhaust. Therefore, intake valve opening (IVO) timing and exhaust valve opening (EVO) timing are fixed. If the IVO timing is close to top dead center (TDC) under part load condition, fuel efficiency may be improved. Therefore, the IVO timing may be fixed at an angle of approximately 0-10 degrees before top dead center (TDC) and the EVO timing may be fixed at an angle of approximately 40-50 degrees before bottom dead center (BDC).

The intake continuous variable valve duration (CVVD) device 400 controls opening duration of an intake valve of the engine according to a signal from the controller 300, and the exhaust continuous variable valve duration (CVVD) device 500 controls opening duration of an exhaust valve of the engine according to a signal from the controller 300.

Figure 3:
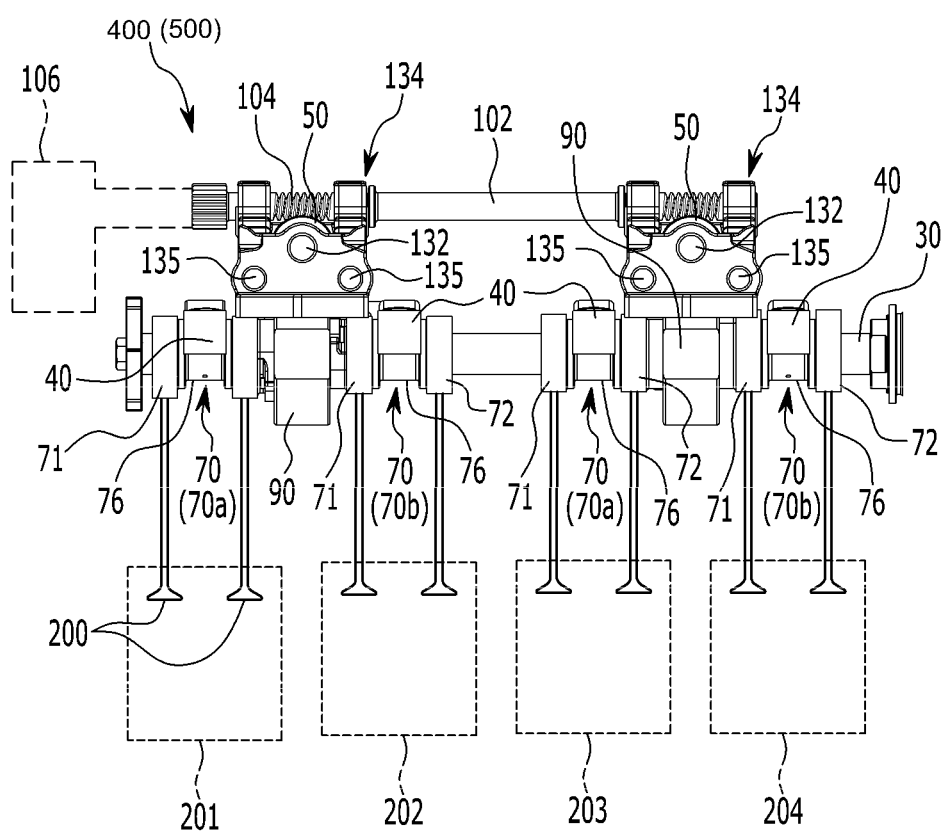
FIG. 3 is a side view of a continuous variable valve duration device assembled with valves operating with engine cylinders.

FIG. 3 is a side view of the CVVD device applied to the intake and exhaust valves in another form as assembled with the valves 200 (e.g., intake valves or exhaust valves) operating with cylinders 201, 202, 203, 204. In one form, two cams 71 and 72 may be formed on first and second cam portions 70a and 70b, and a cam cap engaging portion 76 may be formed between the cams 71 and 72 and supported by a cam cap 40. The valve 200 is opened and closed by being in contact with the cams 71 and 72.

As illustrated in FIG. 3, the CVVD device includes: a cam unit 70 in which a cam 71 is formed and into which a cam shaft 30 is inserted; an inner wheel 80 to transfer the rotation of the cam shaft 30 to the cam unit 70 (See, in FIG. 4); a wheel housing 90 in which the inner wheel 80 rotates and movable in a direction perpendicular to the camshaft 30; a guide shaft 132 having a guide thread and provided in a direction perpendicular to the camshaft 30, the guide shaft mounted by a guide bracket 134; a worm wheel 50 having an inner thread engaged with the guide thread and disposed inside the wheel housing 90; and a control shaft 102 formed with a control worm 104 meshing with the worm wheel 50. The control worm 104 is engaged with an outer thread formed on the outer side of the worm wheel 50. The CVVD device further includes a sliding shaft 135 fixed to the guide bracket 134 and guiding the movement of the wheel housing 90.

Figure 4:
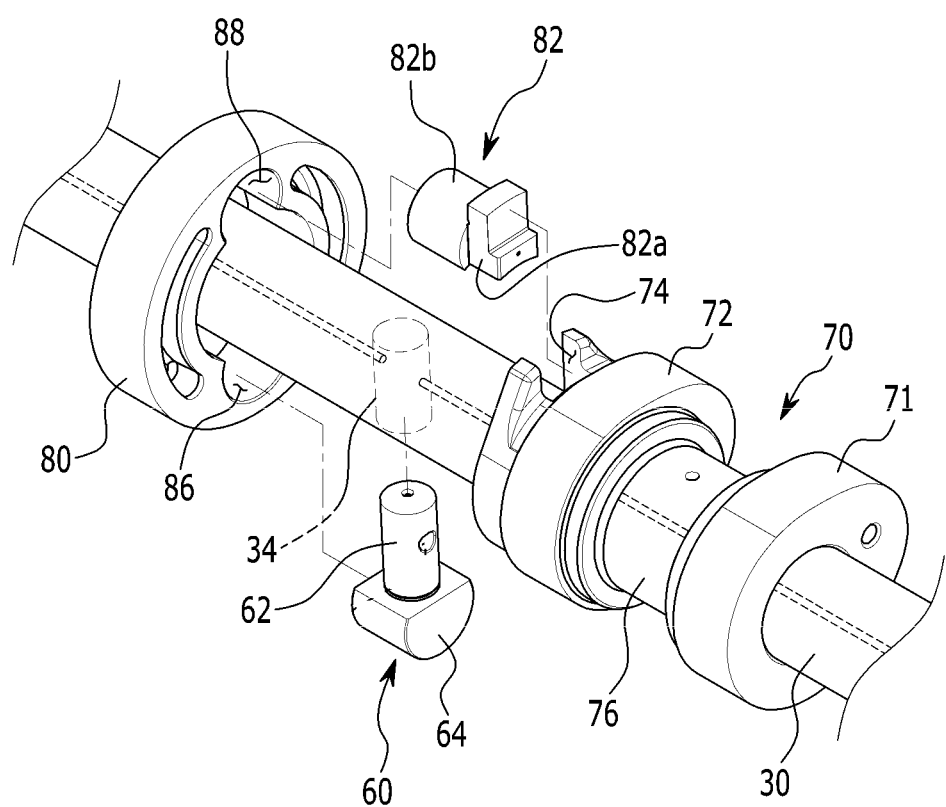
FIG. 4 is a partial view of an inner wheel and a cam unit of a continuous variable valve duration device in one form.

FIG. 4 is a partial view of the inner wheel 80 and the cam unit 70 of the CVVD device of the FIG. 3. Referring to FIG. 4, First and second sliding holes 86 and 88 are formed in the inner wheel 80, and a cam slot 74 is formed in the cam unit 70.

The CVVD device further includes: a roller wheel 60 inserted into the first sliding hole 86 allowing the roller wheel 60 to rotate; and a roller cam 82 inserted into the cam slot 74 and the second sliding hole 88. The roller cam 82 may slide in the cam slot 74 and rotate in the second sliding hole 88.

The roller cam 82 includes: a roller cam body 82*a* slidably inserted into the cam slot 74 and a roller cam head 82*b* rotatably inserted into the second sliding hole 88.

The roller wheel 60 includes: a wheel body 62 slidably inserted into the camshaft 30 and a wheel head 64 rotatably inserted into the first sliding hole 86. A cam shaft hole 34 is formed in the camshaft 30 and a wheel body 62 of the roller wheel 60 is movably inserted into the camshaft hole 34. The structure and operation of the CVVD device discussed above applies to both the intake and exhaust CVVD devices.

FIGS. 5A-5C illustrate the operation of the CVVD device. FIG. 5A illustrates a neutral state in which the rotational center of the camshaft 30 and the cam unit 70 coincide with each other. In this case, the cams 71 and 72 rotate at the same speed as the camshaft 30. When the controller 300 applies a control signal based on engine load and/or engine speed, a control motor 106 rotates the control shaft 102. Then, the control worm 104 rotates the worm wheel 50 which in turn rotates and moves along the guide thread formed on the guide shaft 132.

Figures 7A, 7B, 7C:
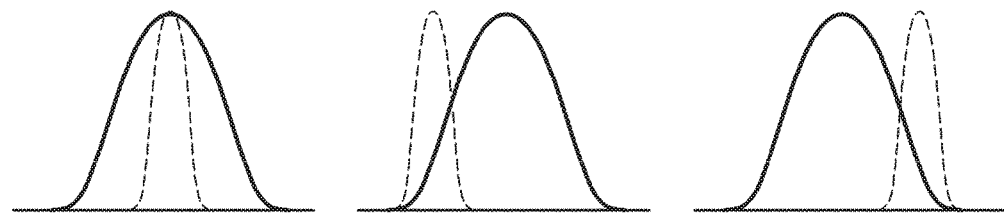
FIGS. 7A-7C are valve profiles of a continuous variable valve duration device in one form.
Figure 8A:
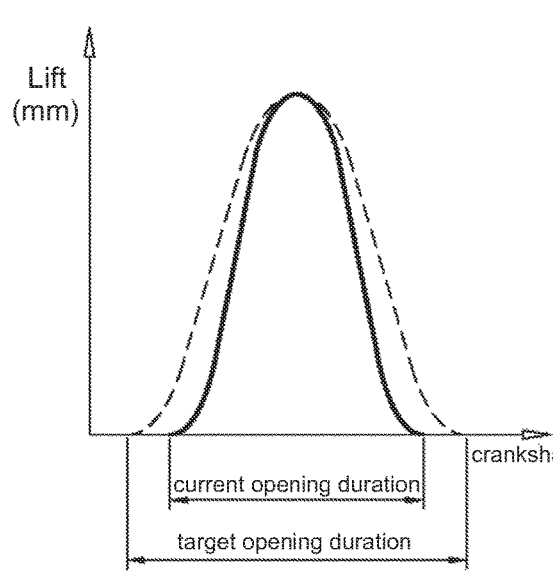
FIGS. 8A-8B illustrate a change of an opening duration and opening and closing timings of a valve.
Figure 8B:
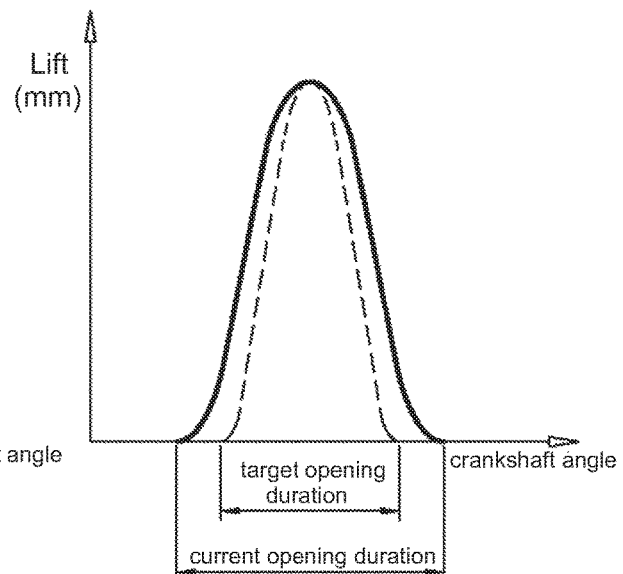

As a result, the worm wheel 50 causes a change to a position of the wheel housing 90 relative to the cam shaft 30. As illustrated in FIGS. 5B and 5C, when the position of the wheel housing 90 moves in one direction with respect to the center of rotation of the camshaft 30, the rotational speed of the cams 71, 72 with respect to the camshaft 30 are changed in accordance with their phases. FIG. 7A and FIG. 8B are drawings showing a valve profile illustrating valve opening duration change by the operation of the CVVD device (i.e., intake CVVD device, exhaust CVVD device). The solid line represents a general valve profile (e.g., a current opening duration), and the dotted line shows the valve profile as a short opening duration (e.g., a target opening duration in FIG. 8B) is applied. FIG. 8A illustrates a changed valve profile when the long opening duration is applied by the CVVD device. The controller 300 determines a target opening duration based on an engine load and an engine speed and controls the CVVD device (i.e., the intake CVVD device, the exhaust CVVD device) to modify current opening and closing timings of the valve based on the target opening duration.

More specifically, as illustrated in FIG. 8B, the CVVD device may retard the current opening timing of the intake valve while simultaneously advancing the current closing timing of the intake valve to shorten the opening duration according to a predetermined value provided by the controller 300. When the controller applies a longer opening duration (i.e., a target opening duration) than the current opening duration, as illustrated in FIG. 8A, the CVVD device may advance the current opening timing of the intake valve while simultaneously retarding the current closing timing of the intake vale so that the modified opening duration becomes longer than the current opening duration. The same operation discussed above applies to the exhaust valve to control an opening duration of the exhaust valve.

Figure 6A:
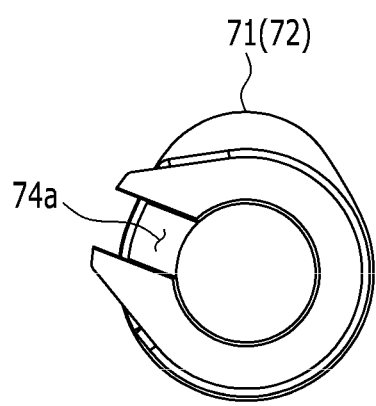
FIGS. 6A and 6B are views illustrating a cam slot of a continuous variable valve duration device in exemplary forms.
Figure 6B:
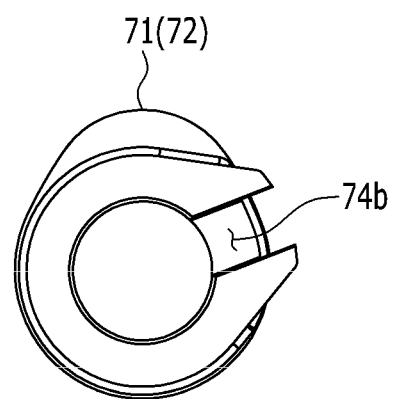

FIGS. 6A and 6B illustrate a view of the cam slot 74*a*, 74*b* of the CVVD device, and FIGS. 7A-7C illustrate valve profiles of the CVVD device in exemplary forms of the present disclosure.

Referring to FIGS. 6A-6B, the cam slot 74*a* may be formed in an advanced position relative to the cam 71, 72, or in another form the cam slot 74*b* may be formed in a retarded position relative to the cam 71, 72. In another form, the cam slot 74*a*, 74*b* may be formed to have the same phase as the lobe of the cam 71, 72. These variations are enable to realize various valve profiles. Based on the position of the cam slot 74*a*, 74*b*, and a contact position between the cam and the corresponding valve (i.e., the intake valve, the exhaust valve), the opening and closing timings of the intake valve (or exhaust valve) may vary. FIG. 7B shows that the CVVD device may advance (for a short opening duration) or retard the current closing timing (for a long opening duration) of the corresponding valve (i.e., intake valve, exhaust valve) by a predetermined value based on the target opening duration of the intake valve or exhaust valve while maintaining the current opening timing of the intake valve or the exhaust valve. In another form, as illustrated in FIG. 7C, the CVVD device may advance (for a long opening duration) or retard (for a short opening duration) the current opening timing of the intake valve or the exhaust valve by a predetermined value based on the target opening duration of the intake valve or the exhaust valve while maintaining the current closing timing of the intake valve or the exhaust valve.

The throttle valve 600 adjusts the air amount flowing into the intake manifold.

The controller 300 may determine control regions depending on an engine speed and an engine load based on signals of the data detector 100 and the camshaft position sensor 120, and the controller 300 controls operations of the intake CVVD device, the exhaust CVVD device 500 and the throttle valve 600. Herein, the plurality of control regions may be classified into six regions.

The controller 300 applies a maximum duration (i.e., a target opening duration) to the intake valve and controls a valve overlap by using exhaust valve closing (EVC) timing in a first control region, maintains maximum duration of the intake valve in a second control region, advances intake valve closing (IVC) timing and the EVC timing in a third control region, controls the IVC timing to be close to bottom dead center (BDC) in a fourth control region, controls the throttle valve to be fully opened and controls the IVC timing to an angle after BDC in a fifth control region, and controls the throttle valve to be fully opened and advances the IVC timing in a sixth control region.

For these purposes, the controller 300 may be implemented with at least one processor executed by a predetermined program, and the predetermined program may be programmed in order to perform each step of a method for controlling valve timing of a continuous variable valve duration engine according to one form of the present disclosure.

Various forms described herein may be implemented within a recording medium that may be read by a computer or similar device by using software, hardware, or a combination thereof, for example.

For example, the hardware of the forms described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units designed to perform any other functions.

The software such as procedures and functions described in the forms of the present disclosure may be implemented by separate software modules. Each of the software modules may perform one or more functions and operations described in the present disclosure. A software code may be implemented by a software application written in an appropriate program language.

Hereinafter, a method for controlling valve timing of a continuous variable valve duration engine according to one form of the present disclosure will be described in detail with reference to FIGS. 9A to FIG. 12C.

Figure 9A:
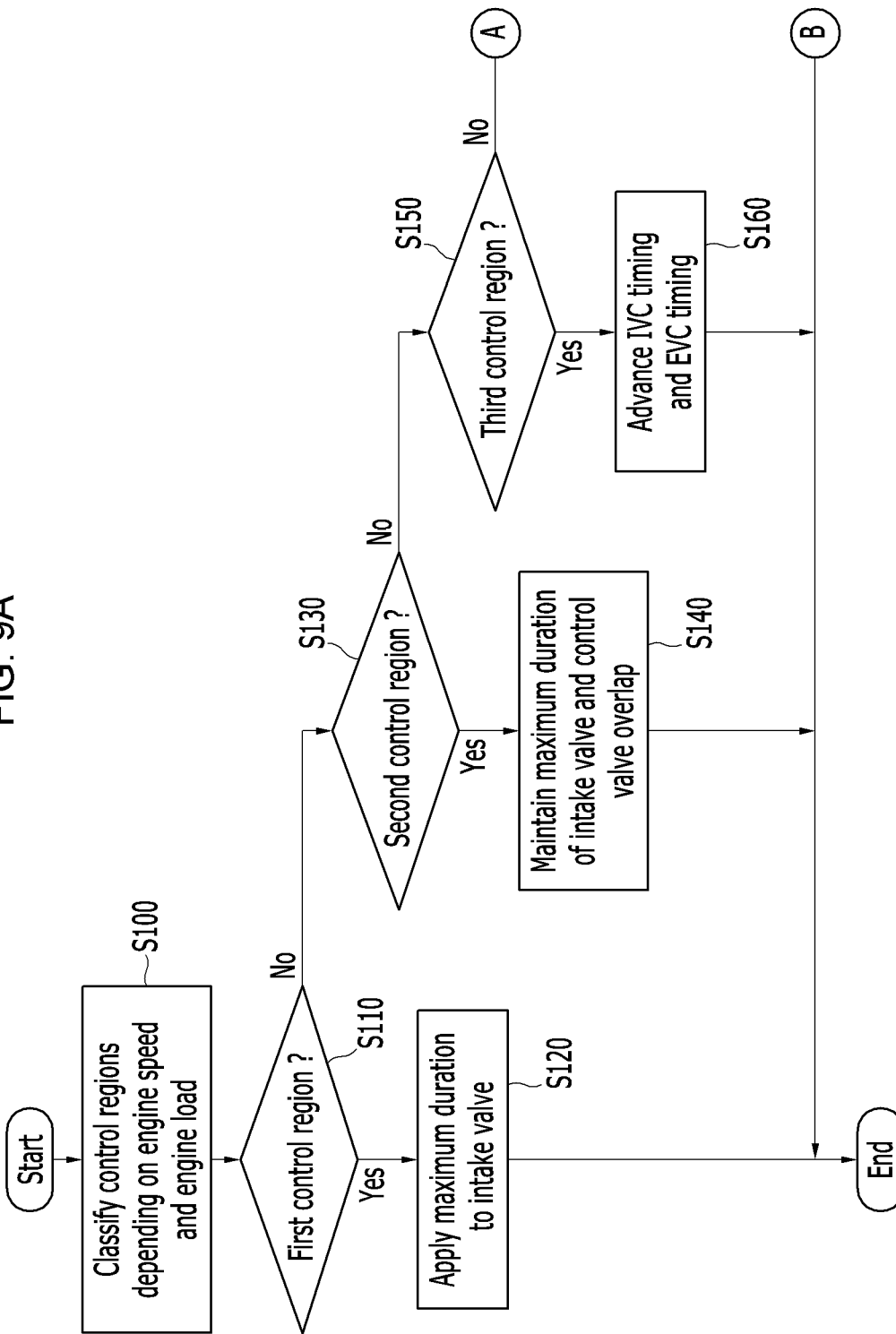
FIGS. 9A and 9B are flowcharts showing a method for controlling valve timing of a continuous variable valve duration engine according to one form of the present disclosure.
Figure 9B:
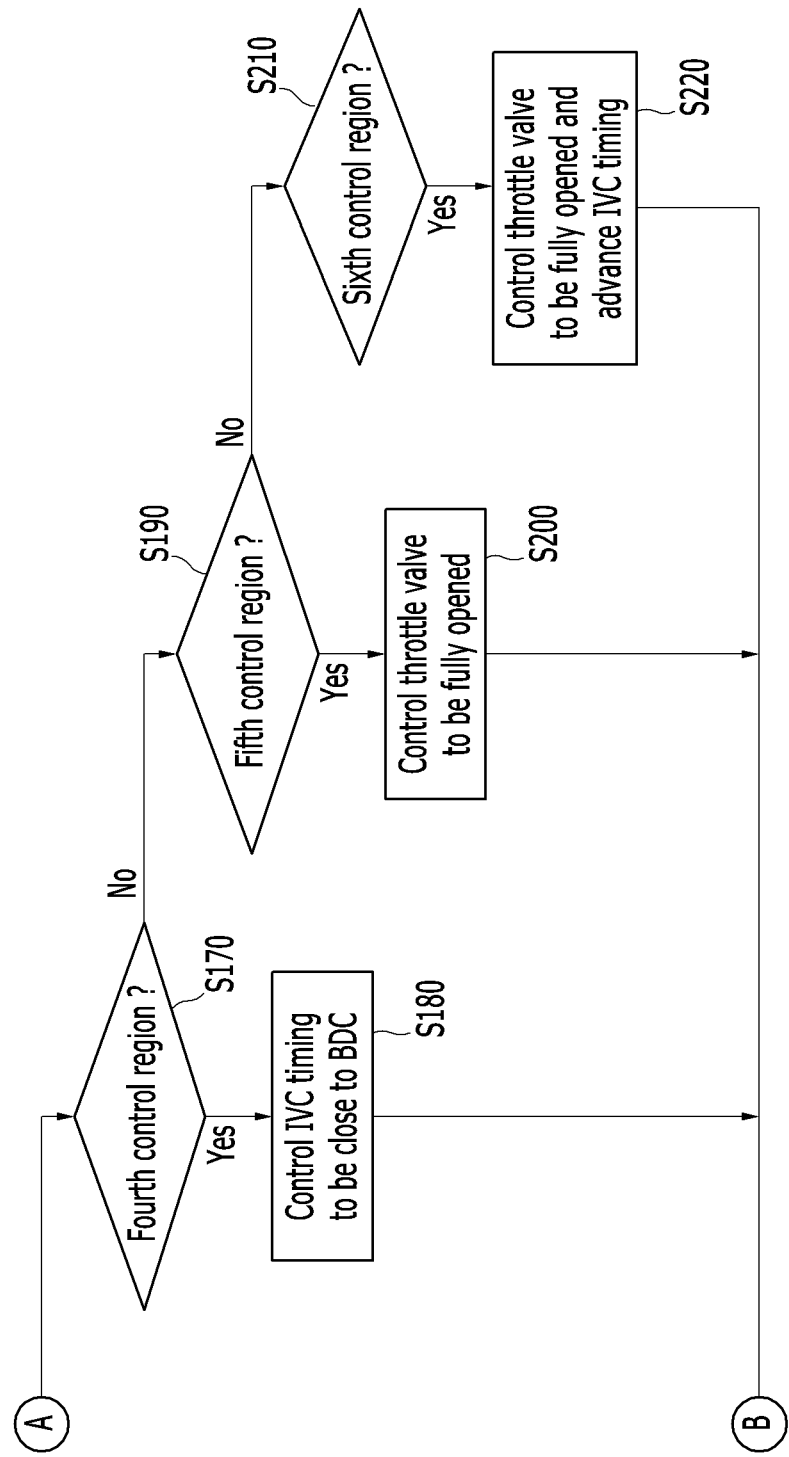
Figure 10:
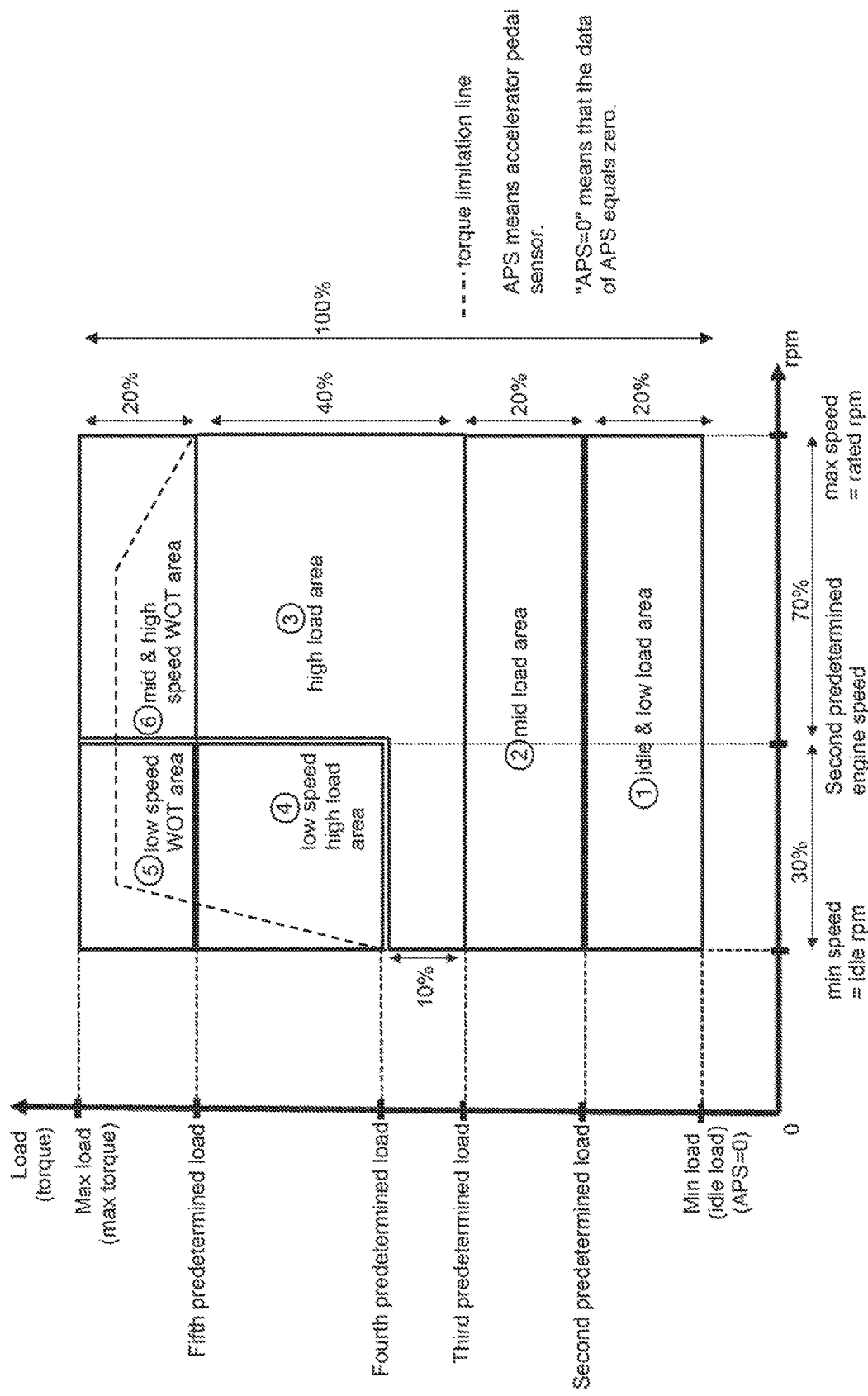
FIG. 10 is a schematic diagram illustrating control regions in one form.

FIGS. 9A and 9B are flowcharts showing a method for controlling valve timing of a continuous variable valve duration engine, and FIG. 10 is a schematic block diagram of showing control regions based on engine load (e.g., engine torque) and engine speed. In addition, FIGS. 11A-11C are graphs showing duration, opening timing, and closing timing of an intake valve depending on an engine load and an engine speed, and FIGS. 12A-12C. 5 are graphs showing duration, opening timing, and closing timing of an exhaust valve depending on an engine load and an engine speed.

As shown in FIGS. 9A and 9B, a method for controlling valve timing of a continuous variable valve duration engine begins with classifying a plurality of control regions depending on an engine load and an engine speed at step S100. The control region may be divided into six control regions (e.g., first, second, third, fourth, fifth and sixth control regions). The first to sixth control regions are indicated in FIG. 10, and FIG. 11A to FIG. 12C in more detail. FIG. 10 schematically describes the control regions based on the engine load (e.g., engine torque) and engine speed (e.g., revolutions per minutes "rpm"). However, the control regions may vary based on engine type or engine size. Mixed control may be performed at the boundary of each region to minimize the control impact of the engine. Accordingly, the range of each region shown in the present application is exemplary, and the classification of each region may be varied.

The controller 300 may determine control regions as a first control region (namely, ① an idling region or a low-load condition) when the engine load is between a first predetermined load (e.g., a minimum engine torque) and a second predetermined load, a second control region (namely, ② an mid-load condition) when the engine load is greater than the second predetermined load and equal to or less than a third predetermined load, and a third control region (namely, ③ a high-load condition) where the engine load is greater than the third predetermined load and less than a fourth predetermined load and the engine speed is between a first predetermined speed (e.g., an idle rpm) and a second predetermined speed, or where the engine load is greater than the third predetermined load and equal to or less than a fifth predetermined load and the engine speed is between the second predetermined speed and a third predetermined speed (i.e., an engine maximum rpm).

In addition, the controller 300 may determine a fourth control region (namely, ④ a low-speed and high-load condition) when the engine load is greater than the fourth predetermined load and equal to or less than a fifth predetermined load and the engine speed is equal to or greater than the first predetermined speed and equal to or less than the second predetermined speed, a fifth control region (namely, ⑤ a low speed-wide open throttle "WOT" condition) when the engine load is greater than the fifth predetermined load and equal to or less than a maximum engine load and the engine speed is between the first and second predetermined speeds, and a sixth control region (namely, ⑥ an mid-high speed-WOT condition) when the engine load is greater than the fifth predetermined load and equal to or less than the maximum engine load and the engine speed is greater than the second predetermined speed and equal to or less than a third predetermined speed (e.g., an engine maximum rpm).

Referring to FIG. 10, the first predetermined load (e.g., a minimum engine torque) is measured when a input from the APS is zero "0," and the second to fifth predetermined loads, and the second and third predetermined engine speeds may be calculated by the following equations:

Second predetermined load=min_$L$+(1/5)×(max_$L$−min_$L$);

Third predetermined load=min_$L$+(2/5)×(max_$L$−min_$L$);

Fourth predetermine load=min_$L$+(1/2)×(max_$L$−min_$L$);

Fifth predetermined load=min_$L$+(4/5)×(max_$L$−min_$L$);

Second predetermined engine speed=min_$S$+(3/10)×(max_$S$−min_$S$); and

Third predetermined engine speed=max_$S$, where, min_L is the minimum engine torque; max_L is a maximum engine torque; min_S is a minimum engine rpm (e.g., Idle rpm); and max_S is a maximum engine rpm.

Meanwhile, as shown in FIG. 11A to FIG. 12C, a crank angle is indicated in an intake valve duration (IVD) map and an exhaust valve duration (EVD) map. For example, regarding the IVD map, a curved line indicated by "240" in the third control region means that the crank angel is approximately 240 degrees, and a curved line indicated by "280" means that the crank angle is approximately 280 degrees. Although not illustrated in FIGS. 11A-11C, a curved line having a crank angle between approximately 240 and 280 degrees may exist between the curved lines.

In addition, a number designated in an intake valve opening (IVO) timing map represents before top dead center (TDC), a number designated an intake valve closing (IVC) timing map represents after bottom dead center (BDC), a number designated in an exhaust valve opening (EVO) timing map represents before BDC, and a number designated in an exhaust valve closing (EVC) timing map represents after TDC.

Regions and curved lines shown in FIG. 11A to FIG. 12C are examples of one form of the present disclosure, and the scope of the present disclosure is not limited thereto.

When the control regions are classified depending on the engine load and the engine speed at step S100, the controller 300 determines whether a current engine state belongs to the first control region at step S110.

When the engine load is between first and second predetermined loads at step S110, the controller 300 determines that the current engine state belongs to the first control region. In this case, the controller 300 applies the maximum duration, or a first intake opening duration to the intake valve and controls the valve overlap between the exhaust valve and the intake valve at step S120. The valve overlap represents a state in which the intake valve is opened and the exhaust valve is not closed yet.

In other words, when the engine is operated at a low load condition, the controller 300 may control the IVC timing to apply the maximum duration to the intake valve. In other words, the controller 300 controls the intake CVVD device to adjust a current opening duration to the first intake opening duration by advancing the IVO timing and retarding the IVC timing. The IVO timing may be fixed in the exemplary form of the present disclosure, and the IVC timing may be fixed at an angle of approximately 100-110 degrees after BDC.

In addition, the controller 300 may set the EVC timing as a maximum value capable of maintaining combustion stability. As the valve overlap is increased, fuel efficiency may be improved, but combustion stability may be deteriorated. Accordingly, properly setting the valve overlap is desired. By fixing the IVC timing and by setting the EVC timing as the maximum value capable of maintaining combustion stability, a valve overlap may be realized, and thus fuel efficiency may be improved. Since the EVO timing is fixed in one form of the present disclosure, as the EVC timing is retarded, exhaust duration is gradually increased.

When the current engine state does not belong to the first control region at step S110, the controller 300 determines whether the current engine state belongs to the second control region at step S130. However, each of the control regions may be determined immediately by the controller 300 based on the engine load and/or engine speed.

When the engine load is greater than the second predetermined load and equal to or less than the third predetermined load at step S130, the controller 300 determines that the current engine state belongs to the second control region. In this case, the controller 300 maintains the maximum duration of the intake valve and controls the exhaust valve to reach a maximum duration at step S140.

The controller 300 retards the EVC timing according to an increase in an engine load such that the exhaust valve reaches the maximum duration. Accordingly, the maximum duration of the intake valve being used in the first control region and the maximum duration of the exhaust valve may be used in the second control region.

When the current engine state does not belong to the second control region at step S130, the controller 300 determines whether the current engine state belongs to the third control region at step S150. The third control region is determined when the engine load is greater than the third predetermined load and less than a fourth predetermined load and the engine speed is between first and second predetermined speeds, or when the engine load is greater than the third predetermined load and equal to or less than a fifth predetermined load and the engine speed is between the second predetermined speed and a third predetermined speed.

When the current engine state belongs to the third control region at step S150, the controller 300 advances the IVC timing and the EVC timing at step S160.

As described above, the IVC timing is controlled to be at a late intake valve close (LIVC) position (at the angle of approximately 100-110 degrees after BDC) in the first control region and the second control region. When the IVC timing is positioned at the LIVC position, as the engine load is increased, boost pressure may be increased, knocking may occur, and fuel efficiency may be deteriorated. In order to prevent or inhibit the aforementioned phenomenon, the controller 300 advances the IVC timing in the third control region where the engine load is relatively large.

In this case, so as to reflect characteristics of the turbo engine, the controller 300 may rapidly advance the IVC timing to be close to BDC when the engine speed is less than a predetermined speed, and may slowly advance the IVC timing to an angle of approximately 30-50 degrees after BDC when the engine speed is equal to or greater than the predetermined speed. For example, the predetermined speed may be approximately 1500 rpm.

In addition, since the EVC timing is positioned at maximum valve overlap in the second control region, the controller 300 may advance the EVC timing to be close to TDC.

When the current engine state does not belong to the third control region at step S150, the controller 300 determines whether the current engine state belongs to the fourth control region at step S170. In another form, the controller 300 may determine the condition for the fourth control region without performing the step of determining the first, second and third control regions.

When the controller 300 determines that the current engine state belongs to the fourth control region at step S170, the controller 300 controls the IVC timing to be close to BDC at step S180.

The fourth control region may be a low boost region (or, a low-speed and high-load region) that the engine load is greater than the fourth predetermined load and equal to or less than the fifth predetermined load and the engine speed is greater than or equal to the first predetermined speed and less than the second predetermined speed. For example, the first predetermined speed (i.e., an idle rpm) may be approximately 1500 rpm or less, and the second predetermined speed may be approximately 2500 rpm.

The controller 300 controls the IVC timing to be close to BDC, thereby improving fuel efficiency. In addition, the valve overlap may be reduced by controlling the EVC timing to be close to TDC. Accordingly, short intake duration (e.g., approximately 180 degrees) may be used in the fourth control region.

When the current engine state does not belong to the fourth control region at step S170, the controller 300 determines whether the current engine state belongs to the fifth control region at step S190.

When the engine load is greater than the fifth predetermined load and equal to or less than a maximum engine load and the engine speed is between the first and second predetermined speeds at step S190, the controller 300 determines that the current engine state belongs to the fifth control region. In this case, the controller 300 controls the throttle valve 60 to be fully opened and controls the IVC timing to an angle after BDC at step S200.

In the turbo engine, when the throttle valve is fully opened (i.e., WOT; Wide Open Throttle) in the fifth control region at which the engine speed is less than the first predetermined speed (e.g., an idle rpm), intake port pressure becomes higher than the exhaust port pressure. Therefore, a scavenging phenomenon occurs easily compared to a natural aspirated engine. In one form of the present disclosure, however, since the IVO timing is fixed, even though the IVC timing is controlled in an after BDC direction, the scavenging phenomenon hardly occurs. More specifically, the fresh air at a higher pressure than that of the burned gases (combustion gas) scavenges the burned gases and evacuates them through the exhaust valve, thus filling the space freed by these gases.

When the current engine state does not belong to the fifth control region at step S190, the controller 300 determines whether the current engine state belongs to the sixth control region at step S210.

When the engine load is greater than the fifth predetermined load and equal to or less than the maximum engine load and the engine speed is greater than the second predetermined speed and less than a third predetermined speed (e.g., a maximum rpm of an engine), the controller 300 determines that the current engine state belongs to the sixth control region. In this case, the controller 300 controls the throttle valve 60 to be fully opened and advances the IVC timing at step S220.

When the engine speed is equal to or greater than a predetermined speed (e.g., approximately 3500 rpm), since the exhaust port pressure is significantly greater than the intake port pressure, the scavenging phenomenon disappears or is reduced. In this case, since the EVO timing is fixed to be advantageous to exhaust pumping, the valve overlap may be reduced by controlling the EVC timing to be close to TDC.

Meanwhile, when WOT control is performed at a high speed condition, the knocking hardly occurs in the natural aspirated engine, but on the contrary, the knocking easily occurs in the turbo engine. Accordingly, the controller 300 advances the IVC timing within an angle range of approximately 50 degrees after BDC to reduce boost pressure such that the knocking is prevented or reduced.

As described above, according to one form of the present disclosure, duration and timing of the continuous variable valve are controlled, so the engine may be controlled under desirable conditions.

Opening timing and closing timing of the intake valve and the exhaust valve are appropriately controlled, thereby improving fuel efficiency under a partial load condition and power performance under a high load condition. In addition, a fuel amount for starting may be reduced by increasing a valid compression ratio, and exhaust gas may be reduced by shortening time for heating a catalyst.

While this disclosure has been described in connection with what is presently considered to be practical forms, it is to be understood that the present disclosure is not limited to the disclosed forms, but, on the contrary, is intended to cover various modifications and equivalent arrangements included within the spirit and scope of the appended claims.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for controlling intake and exhaust valves of an engine, the method comprising:
    determining, by a controller, a target opening duration of the intake valve, a target opening duration of the exhaust valve based on an engine load and an engine speed;
    classifying, by the controller, a plurality of control regions based on the engine load and engine speed, the plurality of control regions including first, second, third, fourth, fifth and sixth control regions;
    modifying, by an intake continuous variable valve duration (CVVD) device, current opening and closing timings of the intake valve based on the target opening duration of the intake valve;
    modifying, by an exhaust CVVD device, current opening and closing timings of the exhaust valve based on the target opening duration of the exhaust valve;
    applying, by the controller, a maximum value of opening duration as the target opening duration to the intake valve in the first control region;
    maintaining, by the controller, the maximum value opening duration of the intake valve and applying a maximum value of opening duration as the target opening duration to the exhaust valve in the second control region;
    retarding the current opening timing of the intake valve while simultaneously advancing the current closing timing of the intake valve by a predetermined value, when the target opening duration of the intake valve in the second, third, fourth, fifth or sixth control region is shorter than a duration between the current opening timing and current closing timing of the intake valve; and
    retarding the current opening timing of the exhaust valve while simultaneously advancing the current closing timing of the exhaust valve by a predetermined value, when the target opening duration of the exhaust valve in the first, third, fourth, fifth or sixth control region is shorter than a duration between the current opening timing and current closing timing of the exhaust valve.

2. The method of claim 1, wherein the intake CVVD device advances the current opening timing of the intake valve while simultaneously retarding the current closing timing of the intake valve until reaching the maximum value of opening duration of the intake valve in the first control region.

3. The method of claim 1, wherein the exhaust CVVD device advances the current opening timing of the exhaust valve while simultaneously retarding the current closing timing of the exhaust valve until reaching the maximum value of opening duration of the exhaust valve in the second control region.

4. The method of claim 1, wherein, in the first control region, the engine load is between first and second predetermined loads, and the controller controls the intake CVVD device to adjust a current intake opening duration to the first intake opening duration.

5. The method of claim 4, wherein, in the first control region, the current closing timing of the intake valve is fixed and the current closing timing of the exhaust valve is set to be a maximum value capable of maintaining combustion stability in the first control region.

6. The method of claim 4, wherein in the second control region, the engine load is greater than the second predetermined load and equal to or less than a third predetermined load.

7. The method of claim 1, further comprising the step of retarding the current closing timing of the exhaust valve until reaching the maximum value as the engine load increases in the second control region.

8. The method of claim 6, further comprising the step of advancing the current closing timing of the intake valve by the intake CVVD device, and advancing the current closing timing of the exhaust valve by the exhaust CVVD device in the third control region where the engine load is greater than the third predetermined load and less than a fourth predetermined load and the engine speed is between first and second predetermined speeds, or where the engine load is greater than the third predetermined load and equal to or less than a fifth predetermined load and the engine speed is between the second predetermined speed and a third predetermined speed.

9. The method of claim 8, wherein the current closing timing of the intake valve is advanced to be approximately at a bottom dead center (BDC) when the engine speed is less than a predetermined speed, and the current closing timing of the intake valve is advanced to be an angle after the BDC when the engine speed is equal to or greater than the predetermined speed in the third control region.

10. The method of claim 8, further comprising the step of controlling the current closing timing of the intake valve to be approximately at a bottom dead center (BDC) in the fourth control region where the engine load is greater than the fourth predetermined load and equal to or less than the fifth predetermined load and the engine speed is equal to or greater than the first predetermined speed and equal to or less than the second predetermined speed.

11. The method of claim 10, wherein the current closing timing of the exhaust valve is controlled to be approximately at a top dead center in the fourth control region.

12. The method of claim 10, further comprising the step of controlling, by the controller, a throttle valve to be fully opened and controlling the current closing timing of the intake valve to be an angle after a bottom dead center in the fifth control region where the engine load is greater than the fifth predetermined load and equal to or less than a maximum engine load and the engine speed is between the first and second predetermined speeds.

13. The method of claim 12, further comprising the step of controlling, by the controller, a throttle valve to be fully opened and advancing the current closing timing of the intake valve in the sixth control region where the engine load is greater than the fifth predetermined load and equal to or less than the maximum engine load and the engine speed is greater than the second predetermined speed and equal to or less than a third predetermined speed.

14. The method of claim 13, wherein the current closing timing of the exhaust valve is controlled to be approximately at a top dead center so as to reduce a valve overlap in the sixth control region.

* * * * *